Feb. 13, 1968 JAMES E. WEBB 3,368,486
ADMINISTRATOR OF THE NATIONAL AERONAUTICS
AND SPACE ADMINISTRATION
SINGLE ACTION SEPARATION MECHANISM
Filed Jan. 29, 1963 2 Sheets-Sheet 1

INVENTORS
WHITNEY McCORMACK
ARTHUR W. SOTHERLUND, JR.
BY
ATTORNEYS

Feb. 13, 1968 JAMES E. WEBB 3,368,486
ADMINISTRATOR OF THE NATIONAL AERONAUTICS
AND SPACE ADMINISTRATION
SINGLE ACTION SEPARATION MECHANISM
Filed Jan. 29, 1963 2 Sheets-Sheet 2

INVENTORS
WHITNEY McCORMACK
ARTHUR W. SOTHERLUND, JR.

BY

ATTORNEYS

United States Patent Office 3,368,486
Patented Feb. 13, 1968

3,368,486
SINGLE ACTION SEPARATION MECHANISM
James E. Webb, Administrator of the National Aeronautics and Space Administration, with respect to an invention of Whitney McCormack, Dallas, Tex., and Arthur W. Sotherlund, Jr., Arlington, Tex.
Filed Jan. 29, 1963, Ser. No. 254,847
6 Claims. (Cl. 102—49.5)

This invention relates to a single action separation mechanism, and more particularly to a separation mechanism for use between stages of a multistage space vehicle.

Considerable difficulty has been experienced in designing mechanism which will result in the immediate separation of the various stages of a space vehicle. A clean and immediate break is particularly important between the last two stages to avoid a condition termed "tipoff." It is readily recognized that if the break between the stages is uneven, the last stage will become tilted or cocked and thereby directed off course.

A series of explosive bolts positioned at equally spaced intervals about the periphery of the space vehicle have been used as a separation device for launch vehicle stages. This arrangement provided a sure method of separating the stages; however, the problem of detonating each bolt simultaneously to obtain an immediate break, has never been satisfactorily solved.

Another mechanism utilized for separating stages of a launch vehicle is that of the shaped charge. As with the explosive bolts, it has been found practically impossible to control the detonation rate of the shaped charge such that every portion of the connecting structure between the stages is severed simultaneously so as to prevent tipoff. Furthermore, these prior art arrangements require a specific remote control mechanism for energization. This additional structure adds to the possibility of malfunction as well as to the weight and complexity of the space vehicle.

The invention disclosed herein provides for a mechanism which overcomes the many problems discussed above. This is accomplished by placing a frangible member between the stages to be separated, and utilizing this frangible member to join the stages. The frangible member is positioned adjacent the exhaust of a rocket motor of one of the stages which when ignited ruptures the frangible member resulting in immediate separation of the stages. The entire separation technique is dependent only on the ignition of the rocket engine, thus eliminating the possibility of the malfunction of other dependent systems such as in prior art devices.

In view of the foregoing discussion, it is an object of this invention to provide a device which will facilitate an immediate and even separation of the stages of a multistage vehicle.

Yet another object of this invention is to provide a separation device for multistage vehicles wherein the propulsion unit of one of the stages is the motivating force for separation.

Still another object of this invention is to provide an arrangement whereby the final stage may be spin-stabilized prior to separation.

Another object of this invention is to provide a unique structure for assembling the separation mechanism and the stages.

Yet another object of the invention is to provide means whereby the propulsion units utilized to spin-stabilize the final stage prior to separation are abandoned to reduce weight.

Another object of this invention is to provide a separation mechanism for multistage space vehicles which is extremely simple in design, yet highly reliable.

Still another object of the invention is to provide a separation technique having high differential stage velocities upon the stages parting to minimize tipoff.

These and other objects and advantages of this invention will become more apparent upon reading the specification in conjunction with the drawings.

Figure 1:
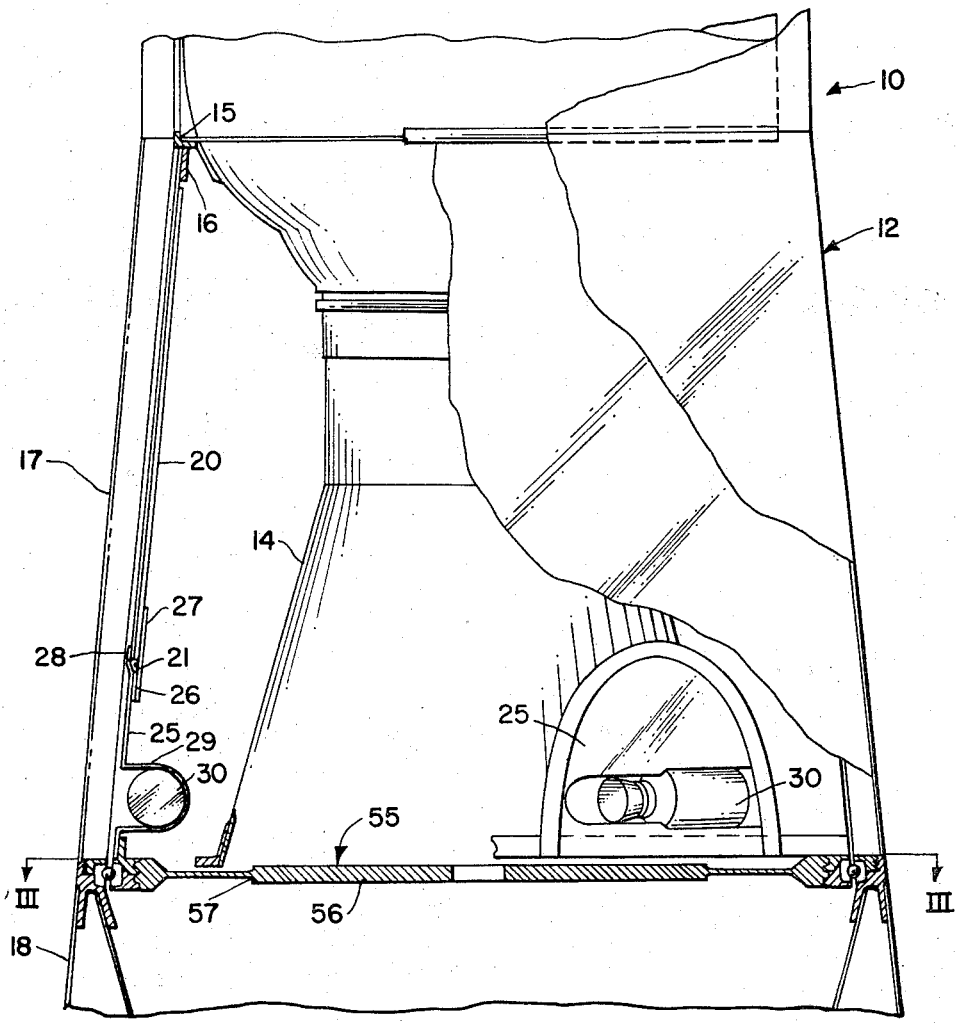
FIG. 1 is a segmental, side elevational view of the last two stages of a multistage launch vehicle, partially cut away to reveal the separation mechanism and spin stabilization arrangement.

Basically, this invention relates to an arrangement for the separation of multistage space vehicles. This is accomplished by the use of a split ring which has the upper segment thereof fixed to the upper or final stage of the space vehicle. The other or lower segment of the split ring underlies the upper segment. The innermost surface of the split ring is provided with a series of continuous threads. These threads engage threads which are formed on a frangible member positioned between the upper and lower stages. The split ring is thus joined by the interaction of the threads on the split ring segments and the threads on the frangible member. The split ring is also provided with a receptacle opposite the threaded surface which receives the race of an annular bearing. The bearing race is clamped between the segments of the split ring. The lower stage is provided wtih a relief which receives the other race of the annular bearing. The last mentioned race is held in position by a locknut or ring which has threaded engagement with the lower stage. Ball bearings are carried between the bearing races.

The frangible member is so located with respect to the rocket motor or engine of a particular stage that when it is ignited the blast of the engine exhaust ruptures the frangible member and causes the threads thereof to withdraw or disengage from the threads of the split ring. When the threads of the frangible member are withdrawn, the segmented ring is free to part allowing the separation of the bearing assembly and thus the separation of the upper and lower stages.

The upper stage is provided with spin rockets utilized to spin stabilize the last stage before separation. This can be accomplished due to the bearing arrangement between the stages to be separated.

Referring now more specifically to the details of the invention, the space vehicle is designated generally by the reference numeral 10. Only a portion of the last two stages of the space vehicle are illustrated to show the environment in which the separation mechanism is operational. Obviously, the principles could be applied to the separation of any of the various stages of a multistage vehicle.

The upper stage or final stage of the vehicle is designated by the reference numeral 12. The upper stage 12 carries a rocket engine or motor having a nozzle 14 as shown in FIG. 1. An attachment ring 15 surrounds the rocket nozzle and is fixed thereto in a conventional manner such as by welding. A support ring 16 is fixed to the attachment ring 15 in a conventional manner such as by welding as shown in FIG. 1. The upper stage may be provided with a jettisonable shell 17 which overlies the support ring 16 and a portion of the lower stage 18 to be explained more fully hereinafter.

A skirt 20 is fixed to the support ring 16 in a manner such as by welding. The skirt 20 surrounds the rocket nozzle 14 and is provided with several pockets or cutouts 21, in the instant case three located at 120° intervals, which receive inserts 25.

The inserts 25 are of a generally semielliptical design and conform in configuration to the pockets 21 formed in the skirt 20. They may be constructed of a heat-resistant material, such as fiber glass, and have a flange 27 and lip 28 separated by a spacer 26. The lip and flange arrangement is continuous about the curved portion of the insert 25 or flange may be a tab located at one or more points about the pockets and forms what might be termed a tongue and groove connection with the pocket 21 as shown in FIG. 1. The flange 27 engages the inside surface of the skirt 20 and the lip 28 the outside surface of the skirt preventing movement of the insert with respect to the skirt other than downward. This arrangement is desirable since when the stages separate, the inserts 25 can drop out and be abandoned, thus reducing the weight of the final stage. The inserts 25 are provided with recesses 29 which receive spin rockets 30. The spin rockets 30 are utilized to spin stabilize the final stage in a manner which will be explained more fully hereinafter.

Figure 2:
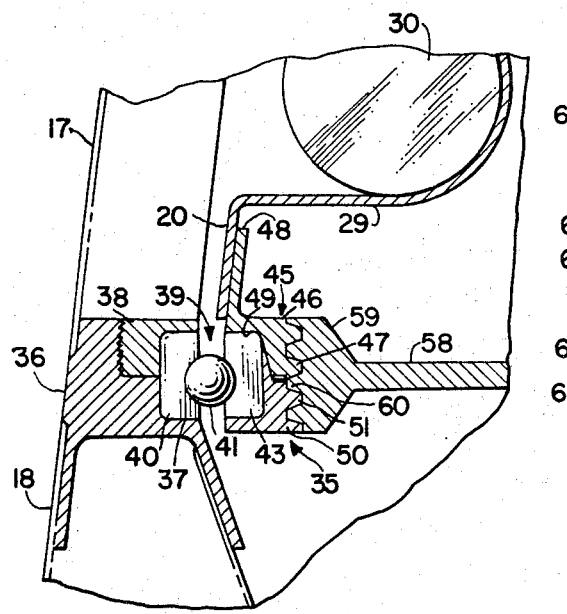
FIG. 2 is a segmental view showing an enlarged cross-section of the separation mechanism.

The details of the release assembly per se, designated generally as 35, are believed best illustrated in FIG. 2.

The release assembly or mechanism 35 includes a spin table ring 36 having downwardly projecting legs to which is fixed the lower stage 18 by means such as welding. It has a relief or platform 37 formed in the inner edge thereof which receives a race 40 of an annular bearing 39. A portion of the upper surface of spin table ring 36 is cut away and threaded to receive a locknut or ring 38. A portion of the locknut 38 is also cut away to conform to the bearing race 40. As shown in FIG. 2, the race 40 is thus clamped in position with respect to the lower stage by the locknut 38 which forces it against the spin table ring platform 37.

The bearing 39 is of an annular design having races 40 and 43 with interposed ball bearings 41. The race 43 is associated with the upper stage in a manner which will become apparent subsequently.

A split or segmented ring, designated generally by the reference numeral 45, is positioned inwardly from the spin table ring 36, and has the upper segment or portion 46 thereof fixed to the upper stage skirt 20. The lower segment 50 underlies the upper segment 46. As illustrated in FIG. 2, the severance line between the upper and lower segments is on an angle such that the lower segment 50 will readily slide out of contact with the upper segment for purposes which will be explained more fully hereinafter. The upper and lower segments are provided with threads 47 and 51, respectively, and when the segments are in mating position, form a continuous uninterrupted thread. The side of the segmented ring 45 opposite the threads is hollowed out to form a receptacle 49 which is formed in both the upper and lower segments. The receptacle 49 receives the other race 43 of the bearing 39.

A disk-like frangible member or diaphragm, designated generally by the reference numeral 55, is positioned between the upper and lower stages 17 and 18 as illustrated in FIGS. 1 and 2. The frangible member 55 is a homogenous member constructed of a material such as aluminum or magnesium alloy. It is also possible to form the frangible member from certain types of steel. It has a core or hub portion 56 from which project fingers or sections 58 formed by equally spaced slots 57, located about the circumference of the member. The slots 57 are of a width, depth, and number as determined by design criteria, taking into consideration the strength of the frangible member and the size of the rocket engine necessary to rupture the frangiblue member. The outer periphery of the frangible member 55 is increased in thickness to form an annulus 59. Threads 60 are formed on the annulus 59 and engage the threads 47 and 51 on the upper and lower segments of the split ring 45 as shown in FIG. 2. It is now also clear from FIG. 2 that the engagement of the frangible member threads 60 with the threads 46 and 51 on the upper and lower segments essentially weld the segmented ring 45 into a unit, and at the same time provides an arrangement whereby the race 43 of bearing 39 is clamped between the upper and lower segments.

Figure 4:
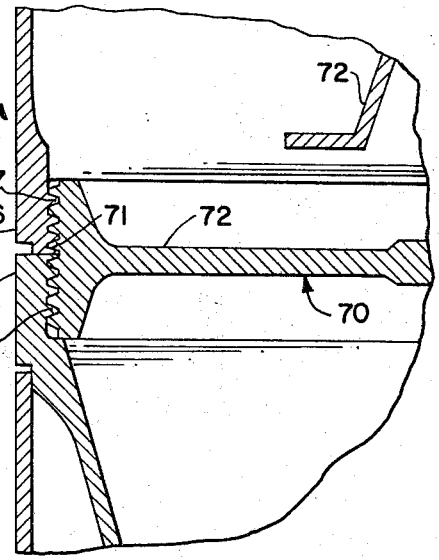
FIG. 4 is a segmental view showing a cross-section of a prior art separation mechanism.

FIG. 4 illustrates a prior art arrangement which shows the basic blow out diaphragm concept. This embodiment of the space vehicle is designated generally by the reference numeral 65. The vehicle has an upper stage 66 with threads 67 formed in the body of the upper stage and projecting into the interior of the vehicle. The lower stage 68 is positioned adjacent the upper stage and also has threads 69 formed therein. The threads 67 and 69 form a continuous series of threads as seen by the frangible member 70. The frangible member 70 has threads 71 formed in its outer periphery which engage the threads 67 and 69 respectively of the upper and lower stages to join them together. The frangible member 70 is otherwise similar in design to the frangible member 55. The rocket nozzle 72 is positioned immediately above the frangible member 70 as in FIG. 1 embodiment.

*Operation*

Prior to separation of the upper and lower stages 17 and 18, it may be necessary to spin stabilize the final stage to accomplish the particular mission intended. The upper stage is spun by energizing the spin rockets 30. They are energized by conventional mechanism such as by an igniter excited by a remote radio signal. Jettisoning of the shell 17 may be accomplished by activation of explosive bolts if the particular space vehicle is provided with such a covering. As shown in FIG. 1, the upper stage is then free to spin relative to the lower stage due to the mounting thereof on the bearing arrangement 39. Once the final stage is spinning at the desired rate, the upper stage is ready to be separated from the lower stage.

This is accomplished by igniting the rocket engine of the last stage. As shown in FIG. 1, the exhaust blast from the rocket nozzle 14 will be imparted directed against the frangible member 55. This will cause the frangible member 55 to rupture or buckle withdrawing the threads 60 thereof from engagement with the threads of the segmented ring 45. Due to the tremendous pressure exerted by the rocket engine, the withdrawal is immediate and simultaneous about the entire periphery of the frangible member.

With the frangible member 55 removed, there is nothing to hold together the segmented ring 45 and the lower segment 50 thereof drops away. With the lower segment removed, the support for bearing race 49 is gone, and it and the balls 41 also fall away providing a clean break between the upper and lower stages. This entire operation takes place in a short enough interval of time and with the necessary symmetry so that any problem of tipoff is minimized.

Once the stages have separated, the inserts 25 are no longer supported by the separation mechanism. Thus, the inserts, together with the spin rockets which they carry, drop out and are abandoned.

The particular reaction of the frangible member 55 when encountered by the force of the rocket engine is not absolutely predictable. The width and depth of the slots 57, as well as the number of slots, are designed such that the fingers or sections 58 are supposed to break when the force from the engine is exerted against the frangible member. However, should these sections not break off, the buckling which results is sufficient to provide a clean break of the threads and thus the proper separation of the stages.

Figure 3:
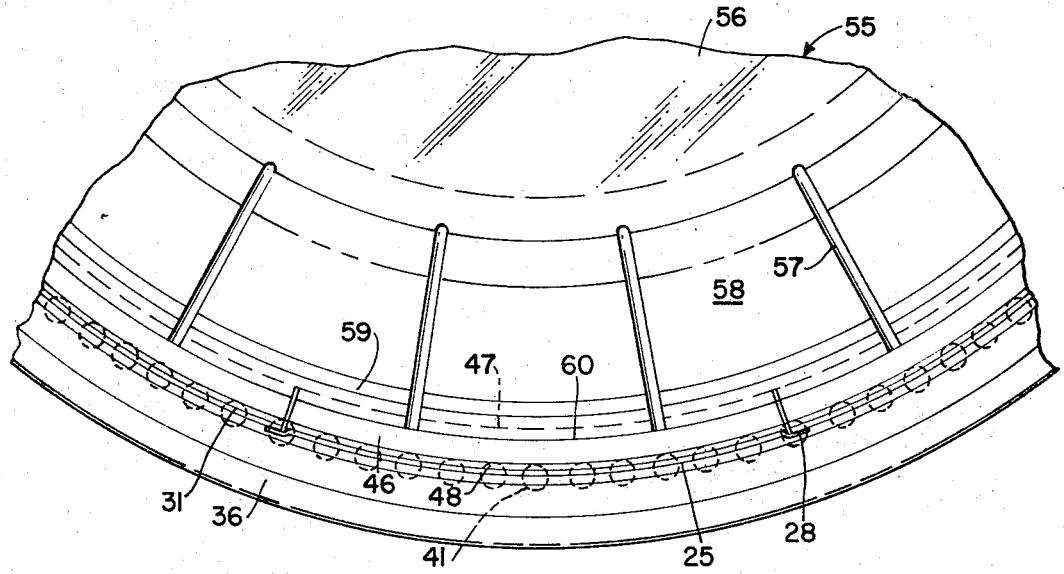
FIG. 3 is an enlarged cross-sectional view taken along the section lines III—III, showing a segment of the cross-section.

The operation of the embodiment shown in FIG. 4 is similar to that shown in FIGS. 1 through 3; however, differs in that the separation of the segmented ring and bearing assembly is not necessary since the threads are formed directly on the upper and lower stages.

From the above description, it can be seen that this invention has a particular advantage over prior art devices since it provides an arrangement which will allow separation of the stages with little or no tipoff. It is further evident that the structure is extremely simple in design, with a minimum number of moving parts all of which enhance its reliability. The components of the separation mechanism are designed for ease of assembly. Furthermore, the separation structure is of minimum weight, the weight of the final stage being further reduced by the abandonment of the spin rockets. The operation of the separation mechanism is essentially that of a single action in that all that is necessary for separation is the withdrawal of the frangible member threads, providing for a fool-proof arrangement and again high reliability.

What is claimed as new and desired to be secured by Letters Patent is:

1. A combination stage separation and spin-up device comprising: an upper stage; a skirt forming a part of said upper stage; pockets formed in said skirt; inserts detachably connected to said skirt and fitting within said pockets; spin rockets carried by said inserts; a lower stage; a split ring having one portion fixed to said skirt and the other portion carried by said lower stage; threads formed on said split ring; a frangible diaphragm between said stages; said frangible diaphragm having an annulus with threads, said annulus threads engaging the threads of said split ring to join said stages; slots formed about the periphery of said frangible member to structurally weaken said frangible member at designated points; bearing means between said split ring and said lower stage whereby ignition of said spin rockets provide relative movement between said stages; said upper stage having a propulsion unit with a nozzle directed against said frangible diaphragm whereby energization of said propulsion unit causes said frangible diaphragm to rupture at said designated points disjoining said annulus threads from said split ring threads thereby separating said stages; said inserts dropping from said skirt upon separation of said upper and lower stages.

2. A combination stage separation and spin-up device as in claim 1 wherein said spin units are mounted on inserts; pockets formed in said upper stage and receiving said inserts; tongue and groove structure between said pockets and said inserts; said inserts and spin rockets automatically falling away upon separation of said upper and lower stages.

3. A connector for stages of a launch vehicle comprising: stages of said vehicle in juxtaposition; a segmented ring having one portion thereof fixed to an upper stage and another portion lying adjacent said one portion; said segmented ring having a relief; bearing means received by said relief; a frangible member between said stages, inner-engaging mechanism between said frangible member and said segmented ring to join said segmented ring portions and clamp said bearing means between the segments thereof; said bearing also being fixed to said lower stage thereby joining said stages; and means for rupturing said frangible means whereby said inner-engaging mechanism disengages resulting in the separation of said segmented ring and said bearing means providing for parting of the stages.

4. A connector for stages of a launch vehicle as in claim 3 wherein said inner-engaging mechanism includes threads formed on said segmented ring and on said frangible member.

5. A connector for stages of a launch vehicle as in claim 3 wherein the other stage has a relief receiving said bearing means; a locknut threadedly engaging said other stage relief to clamp said bearing means therein to facilitate assembly.

6. A connector for stages of a launch vehicle comprising: an upper stage, a segmented ring having one portion thereof fixed to said upper stage and the other portion thereof underlying said one portion; said segmented ring portion having continuous threads and a receptacle; a lower stage; a frangible member between said upper and lower stages having threads, said frangible member threads engaging said segmented ring threads to join said segmented ring portions; bearing means received by said segmented ring receptacle and being clamped therein by inner engagement of said segmented ring threads and said frangible member threads; a relief formed in said lower stage receiving said bearing means, a locknut having threaded engagement with said relief for retaining said bearing means therein, and means for rupturing said frangible means whereby said segmented ring threads and frangible member threads disengage resulting in the separation of said segmented ring and thereby the parting of said upper and lower stages.

References Cited

UNITED STATES PATENTS

| | | | |
|---|---|---|---|
| 1,901,852 | 3/1933 | Stolfa et al. | 102—34.5 |
| 2,796,021 | 6/1957 | Berlin et al. | 102—7.2 |
| 3,070,015 | 12/1962 | Ledwith | 102—495 |

BENJAMIN A. BORCHELT, *Primary Examiner.*

SAMUEL FEINBERG, *Examiner.*

V. R. PENDEGRASS, *Assistant Examiner.*